US010805235B2

United States Patent
Kulkarni et al.

(10) Patent No.: US 10,805,235 B2
(45) Date of Patent: *Oct. 13, 2020

(54) DISTRIBUTED APPLICATION FRAMEWORK FOR PRIORITIZING NETWORK TRAFFIC USING APPLICATION PRIORITY AWARENESS

(71) Applicant: Cisco Technology, Inc., San Jose, CA (US)

(72) Inventors: Karthik Krishna Kulkarni, Fremont, CA (US); Raghunath O. Nambiar, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,635

(22) Filed: Oct. 24, 2017

(65) Prior Publication Data

US 2018/0048589 A1 Feb. 15, 2018

Related U.S. Application Data

(63) Continuation of application No. 14/499,000, filed on Sep. 26, 2014, now Pat. No. 9,825,878.

(51) Int. Cl.
*H04L 12/927* (2013.01)
*H04L 12/801* (2013.01)
(Continued)

(52) U.S. Cl.
CPC ............ *H04L 47/805* (2013.01); *H04L 47/12* (2013.01); *H04L 47/2441* (2013.01); *H04L 47/2475* (2013.01)

(58) Field of Classification Search
CPC ... H04L 47/805; H04L 47/2475; H04L 47/12; H04L 47/2441
See application file for complete search history.

(56) References Cited

U.S. PATENT DOCUMENTS

| 5,812,773 A | 9/1998 | Norin |
| 5,889,896 A | 3/1999 | Meshinsky |

(Continued)

FOREIGN PATENT DOCUMENTS

| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Rasheed Gidado
(74) *Attorney, Agent, or Firm* — Polsinelli PC

(57) ABSTRACT

A system and a method for prioritizing network traffic using application awareness and network awareness in a network environment is disclosed. An exemplary method can include receiving a network traffic priority for network traffic associated with a job performed by a distributed application; and based on the network traffic priority, assigning the network traffic to a network classification model, such as an access control list, associated with a network element for directing the network traffic in a network. The network classification model is associated with a network traffic priority class having defined quality of service (QoS) features, such that the network traffic traverses the network according to the defined QoS features.

20 Claims, 3 Drawing Sheets

(51) Int. Cl.
*H04L 12/851* (2013.01)
*H04L 12/859* (2013.01)

(56) References Cited

U.S. PATENT DOCUMENTS

| | | | |
|---|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,039,053 B1* | 5/2006 | Freed .................. H04L 41/0893 370/392 |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft |
| 7,647,594 B2 | 1/2010 | Togawa |
| 7,773,510 B2* | 8/2010 | Back .................. H04L 45/306 370/230 |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,010,698 B2 | 8/2011 | Carter |
| 8,028,071 B1 | 9/2011 | Mahalingam et al. |
| 8,041,714 B2 | 10/2011 | Aymeloglu et al. |
| 8,121,117 B1 | 2/2012 | Amdahl |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1* | 8/2014 | Chen .................. H04L 41/5022 370/232 |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,634,944 B2* | 4/2017 | Chinnaiah Sankaran ................... H04L 47/2433 |
| 9,658,876 B2 | 5/2017 | Chang et al. |
| 9,692,802 B2 | 6/2017 | Bicket et al. |
| 9,755,858 B2 | 9/2017 | Bagepalli et al. |
| 9,825,878 B2 | 11/2017 | Kulkarni et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2005/0157647 A1* | 7/2005 | Sterne et al. ....... H04L 63/0227 370/235 |
| 2006/0104286 A1 | 5/2006 | Cheriton |
| 2006/0126665 A1 | 6/2006 | Ward et al. |
| 2006/0146825 A1 | 7/2006 | Hofstaedter |
| 2006/0155875 A1 | 7/2006 | Cheriton |
| 2006/0168338 A1 | 7/2006 | Bruegl et al. |
| 2007/0115812 A1* | 5/2007 | Hughes ................. H04L 1/1642 370/229 |
| 2007/0174663 A1 | 7/2007 | Crawford et al. |
| 2007/0223487 A1 | 9/2007 | Kajekar |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell |
| 2009/0182874 A1 | 7/2009 | Morford |
| 2009/0265468 A1 | 10/2009 | Annambhotla et al. |

(56) References Cited

U.S. PATENT DOCUMENTS

| | | |
|---|---|---|
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1* | 9/2012 | Anbazhagan ....... H04L 41/5022 370/235 |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0036930 A1* | 2/2014 | Lih ....................... H04L 49/252 370/429 |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |

(56) References Cited

U.S. PATENT DOCUMENTS

| | | |
|---|---|---|
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1* | 10/2014 | Jilani ............... H04L 45/16 370/390 |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah |
| 2015/0117458 A1 | 4/2015 | Gurkan et al. |
| 2015/0120914 A1 | 4/2015 | Wada et al. |
| 2015/0178133 A1 | 6/2015 | Phelan |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2211502 | 7/2010 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 2014, 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, A White Paper from the Open Cloud Standards Incubator," Version 1.0.0, Document No. DSP-ISO0103, Jun. 16, 2010, 75 pages.

Author Unknown, "Apache Ambari Meetup What's New," Hortonworks Inc., Sep. 2013, 28 pages.

Author Unknown, "Introduction," Apache Ambari project, Apache Software Foundation, 2014, 1 page.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

(56) References Cited

OTHER PUBLICATIONS

Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television " http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
U.S. Appl. No. 14/617,591, filed Feb. 9, 2015, entitled "Distributed Application Framework That Uses Network and Application Awareness for Placing Data," Inventors: Raghunath 0. Nambiar et al.
U.S. Appl. No. 14/327,385, filed Jul. 9, 2014, entitled "Network Traffic Management Using Heat Maps With Actual and Planned/Estimated Metrics," Inventors: Karthik Kulkarni, et al.
Szymaniak, et al., "Latency-Driven Replica Placement", vol. 47 No. 8, IPSJ Journal, Aug. 2006, 12 pages; ftp://ftp.minix3.org/pub/steen/papers/2006.ipsj.pdf.
Xianglong Ye, et al., "A Novel Blocks Placement Strategy for Hadoop," 2012 IEEE/ACTS 11th International Conference on Computer and Information Science, 2012 IEEE, 5 pages; http://www.cs.odu.edut-mukka/cs775s13/Presentations/papers/paper5.pdf.
Lynch, Sean, "Monitoring cache with Chaspin," Facebook Engineering, Sep. 19, 2012.

\* cited by examiner

DISTRIBUTED APPLICATION FRAMEWORK FOR PRIORITIZING NETWORK TRAFFIC USING APPLICATION PRIORITY AWARENESS

TECHNICAL FIELD

This disclosure relates in general to the field of communications and, more particularly, to a system and a method for prioritizing network traffic in a network environment.

BACKGROUND

Data centers are increasingly used by enterprises to achieve collaboration, store data, manage resources, etc. A typical data center network contains myriad network elements. The network connecting the network elements provides secure user access to data center services and an infrastructure for deployment, interconnection, and aggregation of shared resource as required, including applications, servers, appliances, and storage. Improving operational efficiency and optimizing utilization of data center resources are some of the challenges facing data center managers. Data center managers want a resilient infrastructure that consistently supports diverse applications and services and protects the applications and services against disruptions. To address these considerations, data centers are turning to distributed application frameworks, striving to provide infrastructure that optimizes deployment of distributed application frameworks, while enhancing network performance associated with using distributed application frameworks.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and a method for prioritizing network traffic using application awareness and network awareness in a network environment is disclosed. An exemplary method can include receiving a network traffic priority for network traffic associated with a job performed by a distributed application; and based on the network traffic priority, assigning the network traffic to a network classification model, such as an access control list, associated with a network element for directing the network traffic in a network. The network classification model is associated with a network traffic priority class having defined quality of service (QoS) features, such that the network traffic traverses the network according to the defined QoS features.

The network traffic priority can be based on a user priority associated with a user that initiated the job and a task priority associated with a task of the job that generates the network traffic. The user priority can be assigned to the job by the user or assigned to the job based on a default user priority associated with the user. In some embodiments, a priority level of the task priority varies based on underlying data of the network traffic, context that generated the underlying data of the network traffic, or both. The QoS features can define a percentage of a bandwidth of a network link reserved for the network traffic priority class and/or a maximum output rate for the network traffic priority class for the network element when the network is congested.

The method can further include receiving network traffic flow information for the network traffic; and identifying the network element based on the network traffic flow information. The network element may be at least one switch involved with directing the network traffic, wherein the network traffic is assigned to an access control list attached to the at least one switch. In some embodiment, assigning the network traffic to the network classification model includes updating an access control list with an access control list entry that includes a source port, a source IP address, a destination port, and a destination IP address associated with the network traffic. The method can further include removing the access control list entry once network traffic associated with the task ceases.

Example Embodiments

Figure 1:
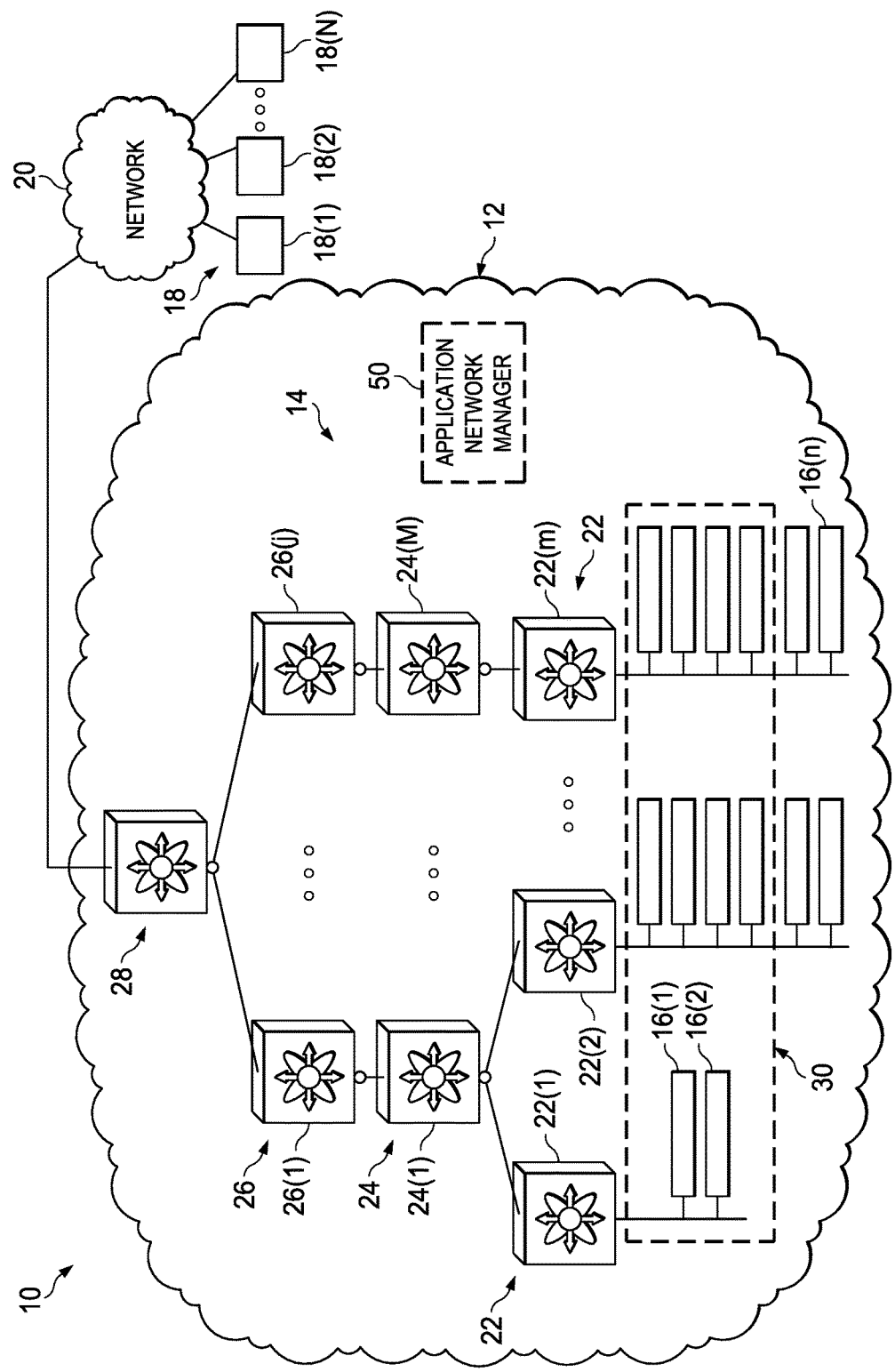
FIG. 1 is a simplified schematic block diagram illustrating a communication system for prioritizing network traffic in a network environment.
Figure 2:
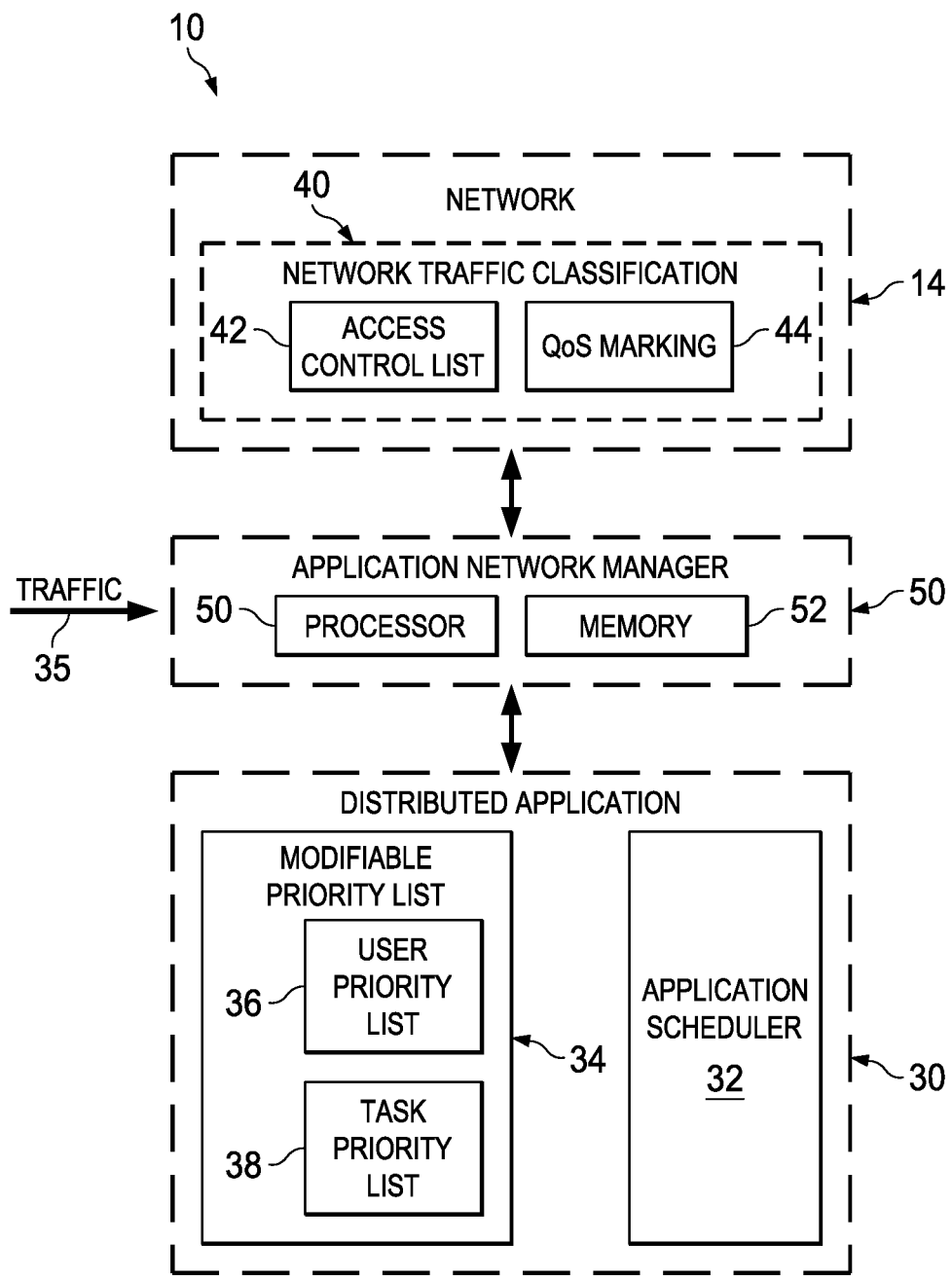
FIG. 2 is a simplified block diagram illustrating example details of the communication system.

FIG. 1 is simplified schematic block diagrams illustrating a communication system 10 for prioritizing network traffic (also referred to as data traffic) in a network environment; and FIG. 2 is a simplified block diagram illustrating an exemplary configuration of communication system 10. For ease of discussion, FIG. 1 and FIG. 2 will be described concurrently. In FIG. 1, communication system 10 includes a network 12. In various embodiments, network 12 can represent an enterprise network, such as a data center network, operated and controlled by a particular entity or organization. In some configurations, network 12 can provide other networks with access to network 12 and authorization to set up secure tunnel(s) with network 12 in accordance, for example, with service level agreements (SLAs).

Network 12 includes a network 14 (generally shown as various links) that interconnect hosts 16(1), 16(2), ..., and 16(n) (generally referred to as hosts 16) and external hosts 18(1), 18(2), ..., and 18(N) (generally referred to as external hosts 18), where n represents a total number of hosts 16 and N represents a total number of external hosts 18. External hosts 18 connect to network 12 over an external network 20. Hosts 16 can communicate (for example, by receiving/forwarding packets) with each other over network 12, and hosts 16 can communicate (for example, by receiving/forwarding packets) with external hosts 18 connected to network 12 over external network 20. Hosts 16 and/or external hosts 18 can provide various information technology services, including web services, database services, data processing services, directory services, and/or other services to network elements. In various embodiments, hosts 16 and/or external hosts 18 can be associated with users (clients) and/or groups that use information technology services provided by network 12. As used herein, the term "host" may include any network element, physical (for example, servers) or virtual (for example, virtual machines), connected to other network elements over a network; and the term "external host" may include any host connected to a network (e.g., network 12) over an external network (e.g., external network 20). Hosts can be servers, applications, network storage facilities (for example, a database and/or a memory), and/or other network elements. In a client-server model, hosts may include servers. In a peer-to-peer network, each computer may be a host.

Network 14 includes various network nodes configured to perform aggregate/core/access roles. For example, network 14 may include access switches, aggregation switches, core switches to aggregate and distribute ingress (upstream traffic) and egress (downstream traffic) traffic, etc. A plurality of switches (virtual and/or physical) may be provided at each access, aggregation, and core level to achieve redundancy within network 12. In the depicted embodiment, network 14 includes top of rack (ToR) switches 22(1), 22(2), . . . , and 22(m) (generally referred to as leaf switches 22) that connect hosts 16 to network 12, where m is a total number of ToR switches 22; access switches 24(1), 24(2), . . . , and 24(M) (generally referred to as access switches 24) that aggregate network traffic from network traffic from ToR switches 22, where M is a total number of access switches 24; core switches 26(1), 26(2), . . . , and 26(j) (generally referred to as core switches 26) that aggregate network traffic from access switches 24, where j is a total number of core switches 26; and aggregate switches 28 that aggregate network traffic from core switches 26, and further connect external network 20 and/or external hosts 18 to network 12. ToR switches 22, access switches 24, core switches 26, and aggregate switches 28 can connect to network 12 via network interfaces, such as ports through which ToR switches 22, access switches 24, core switches 26, and/or aggregate switches 28 connect to one another. In various embodiments, each ToR switch 22 can serve as a Top-Of-Rack (ToR) switch of a respective rack unit in a data center network environment, where network 12 serves as the data center network. ToR switches 22 can include host interfaces, for example, ports through which hosts 16 connect to ToR switches 22, such that leaf switches 22 can forward packets between hosts 16 over network 12 via access switches 24, core switches 26, and/or aggregate switches 28. Aggregate switches 28 can connect to external network 20 via another network interface, such that aggregate switches 28 can forward packets between hosts 16 and external hosts 18 over network 12 via core switches 26, access switches 24, and/or ToR switches 22. In some network topologies, network 14 can include one level of switches (such as a 2-tier fat tree topology) or multiple levels of switches (such as a 3-tier fat tree topology). Virtually any number of switches may be used in network 12 depending on network topology considerations for communication system 10. Furthermore, network 14 may be configured to achieve spine/leaf network topologies that include leaf switches, border leaf switches, and/or spine switches (also referred to as a fabric spine).

As used herein, the term "switch" includes any network element configured to receive packets from a source (e.g., host 16(1)) and forward packets appropriately to a destination in a network (e.g., host 16(n)) or a destination out of network (e.g., external host 18(1)). The term "ToR switch" is inclusive of routers, switches, and such other network elements with packet routing, bridging, and switching functionalities that are connected to one or more hosts (e.g., hosts 16). The term "aggregate switch" is inclusive of routers, switches, and such other network elements with packet routing, bridging, and switching functionalities that are connected to external entities, such as one or more external hosts (e.g., external hosts 18). The term "access switch" and/or "core switch" is inclusive of routers, switches, and such other network elements with packet routing, bridging, and switching functionalities that connect one or more switches (e.g., ToR switches 22, access switches 24, core switches 26, and/or aggregate switches 28). Further, the terms "ToR," "access," "core," and "aggregate" are used merely to distinguish between layers of switches in the network architecture depicted in FIG. 1, and are not meant to be limitations. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

Communication system 10 can include a network topology configured to include any number of servers, virtual machines, switches, routers, and other network nodes interconnected to form network 12. Network elements of FIG. 1 and FIG. 2 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1 and FIG. 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today's network environments, particularly data center network environments, store and analyze a massive amount of data. Challenges arise with how to analyze this massive amount of data to find critical pieces of information that provide a competitive edge. To address these challenges, network environments are turning to distributed application frameworks, striving to provide infrastructure that optimizes deployment of distributed application frameworks, while enhancing network performance associated with using distributed application frameworks. Distributed application frameworks can span across an entire network, where application workloads are distributed among multiple network elements of the network. As used herein, the term "distributed application" refers to software that executes or runs on multiple network elements (e.g., hosts 16, physical or virtual) in a network (e.g., network 12) to achieve a specific goal or task. Further, note that the term "application" as used herein can be inclusive of an executable file having instructions that can be understood and processed by a processor, including a computer, and may further include library modules loaded during execution, object files, system files, hardware logic, software logic, or any other executable modules.

Distributed applications may not have a fixed topology. For example, each instance of a distributed application may include a different logical set of applications that provide the same functionalities, but run on disparate network elements (e.g., hosts 16) that execute distributed applications at any instant in time, which may vary with network load, resource availability, and/or other network considerations. A distributed application can include multiple tiers, where each tier embodies various hardware, software, and management tools with myriad configuration parameters. Moreover, distributed applications can run over heterogeneous hardware platforms and operating systems. In a logical sense, a distributed application may include several layers of applications, for example, a web application layer that supports hypertext transfer protocol (HTTP) requests from users (e.g., associated with hosts 16 and/or external hosts 18); an application layer that provides personalized content to users; and a database layer that supports content management, business object persistence, and other data storage needs. In another logical sense, the distributed application may include a presentation layer (e.g., static web pages, Ajax pages, etc.); a business layer (e.g., Enterprise JavaBeans (EJB), legacy applications, etc.); and/or a persistence layer (e.g., relational databases, file servers, etc.).

Apache™ Hadoop® is an exemplary distributed application that will be used for purposes of describing details of the present disclosure, though details of the present disclosure are relevant to any distributed application, as described further below. Hadoop® can handle massive amounts of data—either transforming data to a more usable structure and format or analyzing and extracting valuable analytics from data. In particular, a Hadoop® application framework can store data sets across a cluster of servers (a Hadoop® distributed file system (HDFS) component) and then perform distributed processing on the cluster (a MapReduce component). Hadoop® clusters can include various nodes distributed across the network that store and/or process data. The HDFS component receives a data file (often referred to as input data), splits the data file into data blocks, and distributes the data blocks among the nodes. The data blocks are processed by the MapReduce component to generate result files, which can be stored in the HDFS component. To enhance reliability and availability of data, data assigned to one node is replicated among other nodes. This replication helps ensure that data can survive node failure or node unavailability. When processing the data, MapReduce workload processing can be divided into a map phase and a reduce phase. In various embodiments, the map phase includes dividing a submitted workload (data file) into smaller sub-workloads (data sub-blocks) and assigning the sub-workloads to mappers, where each mapper can process a sub-workload of the data file and output a sorted list of key-and-value pairs, which can be distributed and/or shuffled to reducers. Each reducer analyzes, condenses, and merges the list of key-value pairs to produce an output (results), which can be stored as a results file. Shuffle traffic can be associated with the process of sorting and transferring the list of key-and-value pairs to reducers. Hadoop® application framework thus manages various types of network traffic, such as ingest traffic, replication traffic, shuffle traffic, and/or other type traffic. Further, for each type of network traffic, underlying data associated with a network traffic type may have varying levels of criticality to Hadoop® application framework. Other distributed application frameworks also manage various types of network traffic in distributed processing environments.

Typically, distributed application frameworks, such as Hadoop® application framework, manage network traffic without considering associated underlying networks, essentially treating the underlying networks as a black box. For example, all network traffic managed by the distributed application framework is treated equally without prioritization. In Hadoop® application framework scenarios, ingest traffic (such as data associated with a new job) is treated the same as shuffle traffic and replication traffic. Various network performance issues can arise from treating all network traffic the same. For example, in some embodiments, storing and processing ingest traffic may be delayed in situations where replication traffic and/or shuffle traffic consume a majority of the underlying network's bandwidth. In another example, network traffic may have underlying data that necessitates a higher priority, yet the distributed application will provide all network traffic equally to the network regardless the underlying data associated with the network traffic. In some embodiments, replication traffic of data upon ingest would benefit from having a higher priority than replication traffic of data upon failure of a node that includes currently used data and/or failure of a node that includes archived data. In yet other embodiments, a processing event may contain unimportant data that can cause network delays, such as a failure of a node that contains archived data or unused data, which can produce ingest traffic that slows down network traffic associated with other tasks and/or jobs.

Communication system 10 is configured to address the issues described above (and others) in offering a system and method for prioritizing network traffic using application level awareness in a network environment. Embodiments of communication system 10 provide a distributed application framework for prioritizing network traffic using application priority awareness. By bringing application level prioritization to the network level, communication system 10 can dynamically and adaptively prioritize network traffic in network 12 based on various network parameters, including network traffic type (for example, ingest traffic, shuffle traffic, replication traffic, and/or other type of network traffic), a network traffic's load on network 12, importance of data associated with a given network traffic type (for example, delineating between replication traffic arising from a failure of data in a currently running job versus replication traffic arising from a failure of unused data (in some embodiments, unused for a few months)), and/or other network parameters. In contrast to other network traffic prioritization schemes that often consider only the network level (for example, by prioritizing data traffic based on network protocol (such as TCP or UDP) ports and/or application layer ports alone, though a same kind of network traffic with similar application ports may have different priorities, where such information is available only at the distributed application level as described above), network traffic prioritization schemes described herein further classify network traffic at the application level with application awareness, considering underlying application context (e.g., what trigger in the application caused the network traffic) and data associated with the network traffic, for example, based on a job producing the network traffic and/or network traffic type. Such configurations can improve network utilization by distributed applications, including improving network and distributed application performance, improving network throughput, and/or minimizing network bottlenecks. Different embodiments may have different advantages than described herein, and no particular advantage is necessarily required of any of the embodiments described herein.

Turning to FIG. 1 and FIG. 2, network 12 provides an infrastructure for deploying a distributed application framework that brings application priority knowledge to network 12. For example, a distributed application 30 is deployed in network 12 that spans various hosts 16. Distributed application 30 can distribute application workloads to the various hosts 16 for processing. In various embodiments, network 12 is configured to provide an infrastructure for deploying a distributed application such as a Hadoop® application framework, where in the present example, for purposes of discussion distributed application 30 represents Hadoop® application framework. In such configurations, a user can initiate a job by loading data into a cluster of hosts 16 (such as a cluster of servers) and describe how to analyze the data. The cluster of hosts 16 can process the data (including replicating the data and shuffling the data) to generate results and store the job results, where the user can access the results from the cluster of hosts 16.

In FIG. 2, distributed application 30 includes an application scheduler 32. Application scheduler 32 can accept jobs from users and schedule corresponding workloads for execution on hosts 16 that are part of distributed application 30. Each host 16 that is spanned by distributed application 30 acts as a work node that can carry out tasks provided by application scheduler 32, where hosts 16 spanned by distributed application 30 can handle multiple tasks in parallel. In various embodiments, when application scheduler 32 receives a request to execute a job within distributed application 30, application scheduler 32 determines what resources are available for executing the requested job. In various embodiments, application scheduler 32 can split the requested job into workloads (or tasks) and distribute the workloads on hosts 16 that are spanned by distributed application 30, for example, based on a scheduling policy.

Distributed application 30 further includes a modifiable priority list 34, which brings application level priority to network traffic 35 (data) arising from a job executing (or running) in network 12. Distributed application 30 can query modifiable priority list 34 to determine a network traffic priority of network traffic 35, for example, query priority of network traffic based on user privileges as described below. In various embodiments, modifiable priority list 34 can serve as a network traffic priority list for all jobs producing network traffic in network 12. In the depicted embodiment, modifiable priority list 34 includes a user priority list 36 and a task priority list 38, and distributed application 30 can assign network traffic priority based on both user priority list 36 and task priority list 38. In various embodiments, an administrator can define user priority list 36 and task priority list 38. Based on user priority list 36 (which can indicate who is running a job) and task priority list 38 (which can indicate what task associated with the job is running), distributed application 30 dynamically determines network traffic priority of network traffic in network 12. In various embodiments, application scheduler 32 can dynamically determine network traffic priority of network traffic corresponding to tasks scheduled and distributed across hosts 16. The present disclosure further contemplates other types of priority lists, priority definitions, and/or priority parameters that may be a part of modifiable priority list 34 and queried by distributed application 30 to assign network traffic priority to network traffic at the application level in network 12.

User priority list 36 (also modifiable) can be represented as depicted in Table 1, in various embodiments. User priority list 36 defines various users and/or groups ("User-Group") that can initiate a job in network 12, along with various priorities that can be assigned to jobs initiated by the users and/or groups. In various embodiments, the various users and/or groups can be associated with hosts 16 and/or external hosts 18.

TABLE 1

User Priority List

| User-Group | Priority | Default Priority |
| --- | --- | --- |
| CXO | 0 | 1 |
| High SLA Customer | 0 | 1 |
| Mid SLA Customer | 1 | 2 |
| Administrator | 0 | 2 |
| Production | 2 | 2 |
| Infra | 3 | 3 |
| Generic | 2 | 3 |

For example, in Table 1, user priority list 36 can define the following users/groups: CXO (executive-level user-group), high service level agreement (SLA) customer, mid SLA customer, administrator, production, infra, generic, or other user-group depending on various configurations of network 12. For each user-group, user priority list 36 can further define a highest priority level a user-group can assign to a job (thereby allowing a user-group to suggest different priorities for the job) and a default priority assigned to the job if no priority is assigned by the user/group. In various embodiments, a job can be assigned priority level 0, 1, 2, 3, and so on, where priority level 0 represents a highest priority level that can be assigned to the job and priority level 3 or higher represents a lowest priority level that can be assigned to the job. For example, jobs initiated by a CXO or a high SLA customer are assigned a default priority level 1, though the CXO or the high SLA customer can bump the job's priority to priority level 0. Likewise, jobs initiated by an administrator are assigned a default priority level 2, though the administrator can bump the job's priority to priority level 0; and jobs initiated by a generic user are assigned a default priority level 3, though the generic user can bump the job's priority to priority level 2. Note that while the administrator can bump a job's priority to priority level 0 (highest defined priority level), the generic user cannot bump the job's priority to a level higher than priority level 2, according to Table 1. Oftentimes, since distributed application 30 may initiate a job in network 12 (for example, where distributed application 30 initiates a replication task upon a node failure), user priority list 36 defines priorities for jobs initiated by distributed application 30 (defined as infra user/group in Table 1). In the present example, jobs initiated by distributed application 30 are assigned the lowest defined priority level (e.g., priority level 3).

Task priority list 38 (also modifiable) can be represented as depicted in Table 2, in various embodiments. Task priority list 38 defines various tasks (identified by a task "ID" and a task "Type") associated with a job that can be performed in network 12. Task priority list 38 can further define each task by its associated network traffic (data). Since a job often involves various tasks having various types of network traffic, task priority can change throughout the job, as discussed in further detail below.

TABLE 2

Task Priority List

| ID | Priority | Max Bandwidth | Type |
|----|----------|---------------|------|
| 1 | 1 | <40% of link or 500 MBPS | Ingest Data |
| 2 | 2 | <20% of link or 100 MBPS | Shuffle/Intermediate Data |
| 3 | 2 | <15% of link or 80 MBPS | Replication of Result Data |
| 4 | 3 | <10% of link or 50 MBPS | Replication of Input Data |
| 5 | 3 | <5% of link or 30 MBPS | Replication of Data Due to Node Failure of Currently Used/Accessed Data |
| 6 | 4 | <5% of link or 10 MBPS | Replication of Data Due to Node Failure of Unused Data (No Job Accessing Data) |

In various embodiments (for example, where distributed application 30 is configured as a Hadoop® application), a job can involve ingest tasks having associated ingest traffic, replication tasks having associated replication traffic, shuffling tasks having associated shuffling traffic, or other tasks having associated network traffic. In various embodiments, replication tasks are defined by its associated replication traffic—for example, replication of result data, replication of input data, replication of data due to a node failure of currently used/accessed data, and/or replication of data due to a node failure of unused data (in other words, no job is currently accessing the replicated data). For example, in Table 2, task priority list 38 can define the following tasks that may be associated with a job: task ID 1, ingest data; task ID 2, shuffle/intermediate data; task ID 3, replication of result data; task ID 4, replication of input data; task ID 5, replication of data due to a node failure of currently used/accessed data; task ID 6, replication of data due to node failure of unused data (for example, where no job is accessing the data being replicated); or other task. For each task, task priority list 38 can further define a priority level and a maximum bandwidth of a network link that can be allocated to each defined task. In various embodiments, each task can be assigned priority level 1, 2, 3, 4, and so on, where priority level 1 represents a highest priority level that can be assigned to the task and priority level 4 or so on represents a lowest priority level that can be assigned to the task. In various embodiments, where multiple network traffic types are flowing through network 12, tasks are allocated bandwidth in a manner that ensures no one task or no one type of network traffic consumes 100% of a network link. According to Table 2, ingest tasks are allocated less than or equal to 40% (or 500 Mbps) of a network link, shuffle tasks are allocated less than or equal to 20% (or 100 Mbps) of the network link, replication tasks of result data are allocated less than or equal to 15% (or 80 Mbps) of the network link, replication tasks of input data are allocated less than or equal to 10% (or 50 Mbps) of the network link, replication tasks of data due to a node failure of currently used/accessed data are allocated less than or equal to 5% (or 30 Mbps) of the network link, and replication tasks of data due to a node failure of unused data are allocated less than or equal to 5% (or 10 Mbps) of the network link. Note that task priority list 38 not only provides for network traffic associated with different tasks but also different types of network traffic associated with a same task. For example, replication tasks can involve four different network traffic types, where task priority list 38 assigns a priority level to each network traffic type—result data having a high priority (e.g., priority level 2), input data and/or currently used data associated with a node failure having a medium/high priority (e.g., priority level 3), and unused data associated with a node failure having a low priority (e.g., priority level 4). Accordingly, the disclosed distributed application framework can capture a context of network traffic and assign different priorities to network traffic based on the context. Such priority assignment can occur even though the different types of network traffic may have a same nature of packets in network 12, for example, a same destination port (e.g., a same TCP destination port).

As noted, distributed application 30 spans various hosts 16 in network 12, where network 14 connects the various hosts 16 to facilitate the distributed application framework. In FIG. 2, network 14 includes a network traffic classification model 40 that can classify (mark) network traffic 35 for quality of service (QoS) through various network classification methodologies, such as access control lists, along with applying mapping and/or policies to network traffic 35, bringing application level priority to network traffic 35 arising from a job executing (or running) in network 12. In various embodiments, network traffic classifier 40 can define various policies and/or priorities for routing network traffic to/from hosts 16 and/or external hosts 18. Network 14 can perform traffic classification for metric collection, bandwidth provisioning, resource allocation, security policy enforcement, and/or other reason. For example, network traffic classification model 40 can provide policy-based QoS network traffic classification (marking) using any appropriate QoS technology, including access control lists (ACL), policy-based routing (PBR), class-based routing (CBR), which in turn can use various technologies for tagging network traffic to specific priorities (for example, differentiated services (DiffServ), IP Precedence (IPP), or other priority QoS signaling mechanism), and/or other appropriate QoS technology. In furtherance of the example, network traffic classification model 40 can also provide policing, such as bandwidth policing that can be achieved through various technologies, such as class-based policing and/or committed access rate (which can use QoS classification and other technologies to limit input rate and/or output rate for an interface/port).

Here, network traffic classification model 40 implements access control lists (ACLs) 42 for filtering network traffic that traverses network 14. ACLS 42 use various access criteria, including source address of network traffic, destination address of network traffic, protocol associated with network traffic, and/or other information. In various embodiments, ACLs 42 are attached to network elements of network 14, where the network elements can decide whether to forward or filter (for example, drop) network traffic based on ACLs 42. For example, switches including ToR switches 22, access switches 24, core switches 26, and/or aggregate switches 28 of network 14 can examine network traffic to determine whether to forward or filter network traffic based on criteria specified in ACLS 42. In various embodiments, ACLs 42 can block or permit network traffic having specific addresses or ranges of addresses to be received or transmitted by the switches. In various embodiments, described further below, ACLs 42 can include access control lists that define different network traffic filtering criteria for different priority network traffic. For example, ACLs 42 can include an access control list that defines network traffic filtering criteria for network traffic associated with CXO and high SLA user-groups (which can be referred to as a cxo-high-sla access control list); an access control list that defines network traffic filtering criteria associated with high priority shuffle traffic and high priority replication traffic (which can be referred to as a high-priority-shuffle-replication access control list); an access control list that defines network traffic filtering criteria associated with low priority shuffle traffic and mid-priority replication traffic (which can be referred to as a low-shuffle-mid-replication access control list); an access control list that defines network traffic filtering criteria associated with low priority replication traffic (which can be referred to as a low-priority-replication access control list); and an access control list that defines various access criteria associated with low priority background tasks (which can be referred to as a low-priority-background-tasks access control list). Criteria (filters) of ACLS 42, such as source ports, destination ports, and/or network protocols, can be populated dynamically based on network traffic resulting from jobs running and/or initiated in network 12. Such knowledge will be available to distributed application 30, and as network traffic flows originate, the criteria (filters) can be added to respective ACLs 42 based on network traffic priority.

Switches of network 12 (here, ToR switches 22, access switches 24, core switches 26, and/or aggregate switches 28) can mark network traffic 35 (for example, using various technologies and/or protocols mentioned above), thereby applying QoS features to network traffic 35. In various embodiments, network classification model 40 can implement QoS marking 44, which can define a level of classification using class maps and/or policy maps globally, where the class maps and/or policy maps apply to (attach to) each network element associated with network 14. For example, a class map and/or policy map is attached to any network element responsible for directing network traffic flows in network 12 (such as ToR switches 22, access switches 24, core switches 26, and/or aggregate switches 28). An administrator can define the class maps, which define network traffic according to various criteria based on desired filtering/classifying configurations, and/or policy maps, which can define actions and/or functions that can be applied to classified network traffic. Network traffic can then be classified based on match criteria specified by the class maps and/or policy maps. A traffic class can be defined by a class map name, one or more match commands that define match criteria for the class map, and instructions on how to evaluate match commands when the administrator has specified more than one match command (for example, a match any command or match all command). In various embodiments, network traffic priority classes can be defined, where network traffic is assigned to network traffic priority classes.

For purposes of the following discussion, QoS marking 44 can define network traffic classes having defined QoS policies and/or priorities, while further specifying bandwidth utilization across network elements of network 14. In various embodiments, QoS marking 44 can implement class-based QoS policy for network elements responsible for directing network traffic (such as switches of network 14), though it is noted that the present disclosure contemplates QoS marking 44 implementing any network traffic classification technology and/or protocol. For example, QoS marking 44 can include a class-based QoS policy map that defines traffic classes, traffic policies associated with the traffic classes, policing policies associated with the traffic classes, and/or other network traffic filter/classification parameters. Class-based QoS policy map can define traffic policies for various network traffic classes, essentially defining a number of network traffic lanes for switches in network 14. For example, an exemplary class-based QoS policy map named policyHadoopLikeDistributedSystem can be defined by Router(config) # policy-map command, and configured on each network element (for example, each switch), as follows:

```
Router(config)# policy-map policyHadoopLikeDistributedSystem
Router(config-pmap)# class top-priority
Router(config-pmap-c)# match access-group cxo-high-sla
Router(config-pmap-c)# priority percent 40
Router(config-pmap)# exit
Router(config-pmap)# class second-priority
Router(config-pmap-c)# match access-group high-priority-shuffle-
replication
Router(config-pmap-c)# priority percent 20
Router(config-pmap)# exit
Router(config-pmap)# class third-priority
Router(config-pmap-c)# match access-group low-shuffle-mid-replication
Router(config-pmap-c)# priority percent 15
Router(config-pmap)# exit
Router(config-pmap)# class fourth-priority
Router(config-pmap-c)# match access-group low-priority-replication
Router(config-pmap-c)# priority percent 10
Router(config-pmap-c)# police output 8000000 100000
Router(config-pmap)# exit
Router(config-pmap)# class last-priority
Router(config-pmap-c)# match access-group low-priority-background-tasks
Router(config-pmap-c)# priority percent 5
Router(config-pmap-c)# police output 8000000 100000
Router(config-pmap)# exit
```

Here, class-based QoS policy map defines five different network traffic priority classes for network elements (such as for each switch of network 14), where network traffic belongs to a defined network traffic priority class when it matches a specified access control list, such as one of ACLs 42. For example, Router(config-pmap) # class commands can define a top-priority network traffic class, a second-priority network traffic class, a third-priority network traffic class, a fourth-priority network traffic class, and a last-priority network traffic class. In various embodiments, Router(config-pmap-c) # match access-group commands will place network traffic assigned to cxo-high-sla access control list in top-priority network traffic class, network traffic assigned to high-priority-shuffle-replication access control list in second-priority network traffic class, network traffic assigned to low-shuffle-mid-replication access control list in third-priority network traffic class, network traffic assigned to low-priority-replication access control list in fourth-priority network traffic class, and network traffic assigned to low-priority-background-tasks access control list in last-priority network traffic class. Further, class-based QoS policy map define QoS features for each defined network traffic priority class, such as a priority assigned to the network traffic priority class that specifies a percentage (or data transfer rate, such as kilobytes per second (kbps)) of a network link's bandwidth reserved for the network traffic priority class, and/or a traffic policing parameter that can limit an input data rate or output data rate of the network traffic priority class for a network element (such as a switch interface (port)). For example, using Router(config-pmap-c) # priority commands, class-based QoS policy map configures (and essentially guarantees) 40% of a network link's bandwidth to top-priority network traffic class, 20% of the network link's bandwidth to second-priority network traffic class, 15% of the network link's bandwidth to third-priority network traffic class, 10% of the network link's bandwidth to fourth-priority network traffic class, and 5% of the network link's bandwidth to last-priority network traffic class. A remaining 10% of the network link's bandwidth can be allocated to network traffic assigned to a default class, or used by any of the network traffic priority classes. In various embodiments, when a given network traffic priority class is not using its configured bandwidth, the other network traffic priority classes can share any unused bandwidth. For example, if top-priority network traffic class is using only 20% of the network link's bandwidth, the other priority network traffic classes can share the other 20% of the network link's bandwidth reserved for top-priority network traffic class. In various embodiments, when network 12 experiences congestion, no priority network traffic class can use bandwidth in excess of that allocated.

In furtherance of the example, a police command can be defined that suggests dropping packets when defined limits are exceeded, such as that defined for the fourth-priority network traffic class and the last-priority network traffic class. Using Router(config-pmap-c) # police commands, class-based QoS policy map configures a maximum amount of traffic (by data transfer rate, such as bits per second (bps)) and burst size (how much network traffic can be sent within a given time without creating scheduling concerns) that can be output by the network element implementing class-based QoS policy map. For example, for fourth-priority network traffic class and low-priority network traffic class, network traffic can be output from network elements implementing class-based QoS policy map (such as switches of network 14) at a maximum rate of 8,000,000 bits/second and/or a maximum burst size of 100,000 bytes per second. Network traffic belonging to the fourth-priority network traffic class or low-priority network traffic class that exceeds these parameters will be dropped by the associated network element routing the network traffic, thereby providing "policing" of the network traffic. Class-based QoS policy map can further define other QoS features not specified in the present example.

In the distributed application framework described herein, an application network manager 50 (also referred to as an application network controller) can bring intelligence of distributed application 30 to network 12 (for example, network elements of network 14 can direct network traffic using application priority awareness) and intelligence of network 12 to distributed application 30 (for example, distributed application 30 can evaluate network traffic characteristics to assign network traffic priority). Application network manager 50 is an application implemented on one or more suitable network elements configured with appropriate hardware and software components to perform the operations described herein. For example, the application can be implemented on switches of network 14, hosts 16, external hosts 18, or other network element. In various embodiments, application network manager 50 can be implemented as a plug-in to the distributed application framework of network 12, allowing the distributed application to become network aware, improving network utilization, network performance, and/or network predictability for network 14 and/or distributed application 30. In various embodiments, application network manager 50 can include a processor 50 and a memory element 52 that can be used to perform operations described herein. The memory element 52 can store information associated with network 12, in some embodiments, consolidating information associated with network 14 and distributed application 30. Application network manager 50 can be a part of distributed application 30, such as a part of Hadoop® like application framework, or as a stand-alone application (in other words, separate from distributed application 30). In various embodiments, application network manager 50 and application scheduler 32 can reside in a same application. In some embodiments, application network manager 50 can be a distributed application. In some embodiments, application network manager 50 can be distributed across more than one application.

In various embodiments, network 12 can implement an application-defined networking (ADN) or software-defined networking (SDN) environment, where an application can adapt network 12 to meet requirements (for example, network and/or security policies) of the application. In SDN networking environments, network 12 can be configured to decouple a control plane and a data plane, moving the control plane (such as network intelligence and policy making) to an application, which can be referred to as an SDN controller. In such scenarios, application network manager 50 can be implemented as an SDN controller for network 12. In various embodiments, communication between the distributed application framework and network framework can be implemented as part of SDN applications using available communication technologies, such as OpenFlow, SNMP, onePK (Cisco® One Platform Kit) for communication with network 12 to gather information.

In FIG. 2, application network manager 50 is configured to communicate with an application level (e.g., distributed application 30) and a network level (e.g., network 14) of network 12. For example, application network manager 50 can communicate with distributed application 30 and network 14 (in particular, switches of network 14, such as ToR switches 22, access switches 24, core switches 26, and/or aggregate switches 28) to exchange information between distributed application 30 and network 14. Application network manager 50 can receive priority information, such as network traffic priority, associated with network traffic 35 from distributed application 30. In some embodiments, application network manager 50 communicates with application scheduler 32 to obtain network traffic priority information. Based on the network traffic priority, application network manager 50 dynamically adds network traffic 35 to ACLs 42, which as detailed above are associated with different network traffic priority classes (for example, network traffic priority classes defined by class-based QoS policy map) for prioritizing and/or rate limiting network traffic associated with particular tasks. According to the present disclosure, in various embodiments, only ACLs 42 are updated dynamically, while QoS marking features defined by QoS marking 44 (such as policy maps, class maps, and/or network traffic priorities) can be globally added once to network elements of network 12. In various embodiments, dynamic changes are not made to QoS marking features defined by QoS marking 44. In some embodiments, dynamically updating ACLs 42 can be implemented by an application programming interface associated with application network manager 50.

A network traffic prioritization protocol (also referred to as a data traffic prioritization protocol) can be implemented by application network manager 50 that involves assigning network traffic to ACLS 42 based on what network traffic class the network traffic belongs to based on network traffic priority (which considers who is running the job and what task is generating the network traffic). Network traffic prioritization protocol can be implemented at various network traffic levels. For example, in scenarios where distributed application 30 is implemented as Hadoop® like application frameworks, network traffic prioritization protocol can be implemented to assign ingest traffic (for example, associated with new job data), replication traffic, shuffle traffic (or intermediate traffic within network 12), or other network traffic type to ACLS 42.

Figure 3:
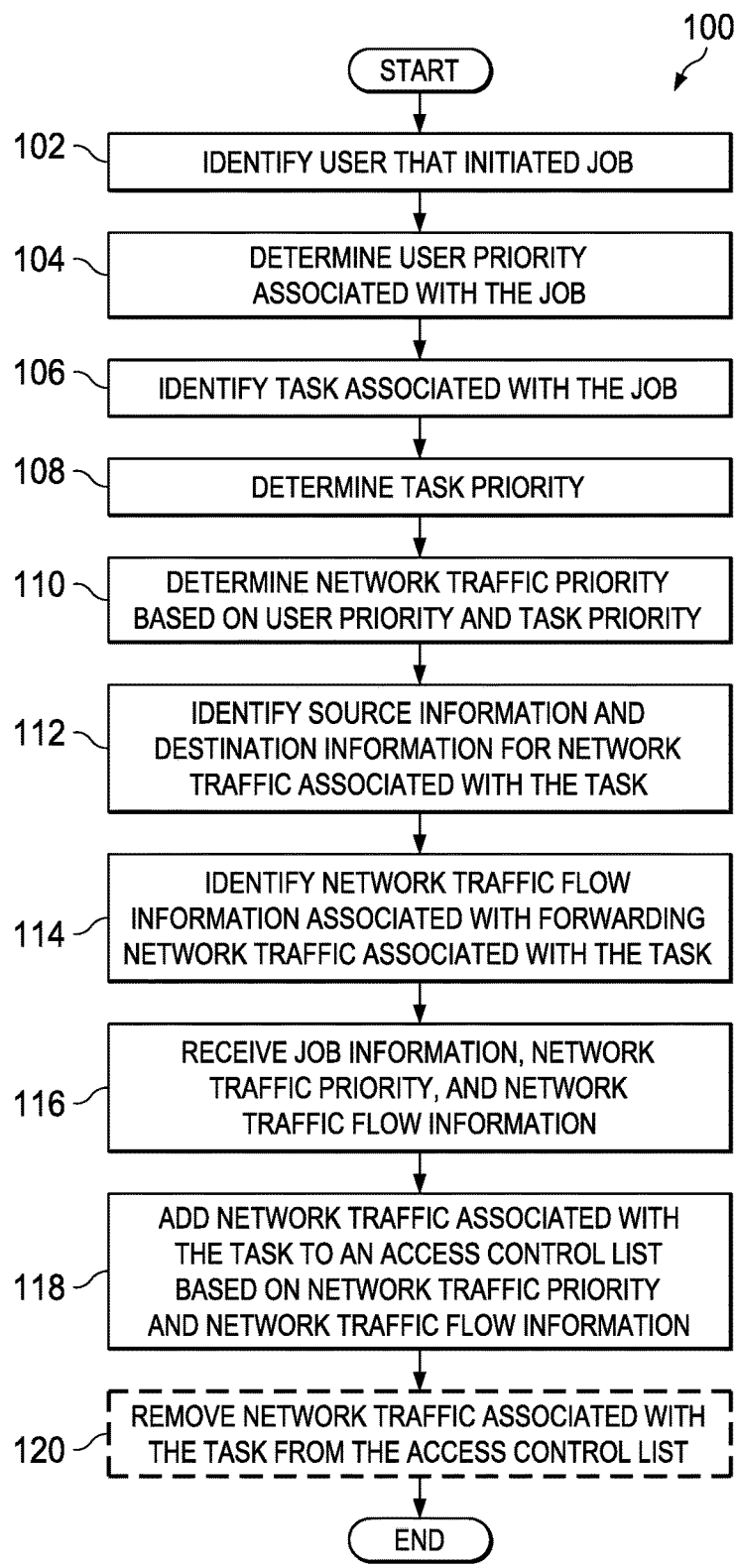
FIG. 3 is a simplified flow diagram illustrating example operations that can be associated with an embodiment of the communication system.

Turning to FIG. 3, FIG. 3 is a simplified flow diagram illustrating an exemplary method 100 that may be associated with embodiments of communication system 10. In various embodiments, method 100 can involve application network manager 50 communicating with distributed application 30 and network 14 to achieve application level awareness for network 14 and network level awareness for distributed application 30. At block 102, distributed application 30 (for example, application scheduler 32) can receive a job, and identify a user-group (in other words, who) initiated the job. At block 104, distributed application 30 determines identifies a user priority level associated with the job. For example, distributed application 30 may determine that the user-group has assigned a priority level to the job, where distributed application 30 uses the assigned user priority level. In some embodiments, a job priority could be received when the job is initiated. In another example, distributed application 30 can query user priority list 36 to determine user priority level. In some embodiments, the user priority level is a default priority level defined for jobs initiated by the user-group. At block 106, distributed application 30 determines a task associated with the job. For example, in various embodiments, distributed application 30 determines a task ID associated with a task of the job, where the task ID may be associated with an ingest task, a replication task, or a shuffle task. In various embodiments, different task IDs can be associated with a same task that generates different network traffic types. At block 108, distributed application 30 can determine a priority level of the identified task by querying task priority list 38. At block 110, distributed application 30 can then determine a network priority level for network traffic associated with the task based on the user priority and the task priority. In various embodiments, network priority level can be determined simply by summing the user priority and the task priority.

At block 112, distributed application 30 (for example, application scheduler 32) can identify source information and destination information for network traffic associated with the task. For example, distributed application 30 can determine where to direct network traffic associated with the task, such as a source node and a destination node, which can be one of hosts 16 and/or one of external hosts 18. In various embodiments, distributed application 30 can negotiate with network elements of network 12 to identify source nodes and destination nodes. At block 114, distributed application 30 can identify network traffic flow information associated with forwarding network traffic associated with the task. For example, distributed application 30 can start the task to identify network elements for receiving/forwarding network traffic associated with the task. In another example, distributed application 30 determines network elements for receiving/forwarding network traffic associated with the task and communicates with the network elements to obtain network traffic flow information (for example, a port or interface of the network elements that will receive the network traffic). In various embodiments, application scheduler 32 can identify network elements of network 14 (for example, ToR switches 22, access switches 24, core switches 26, and/or aggregate switches 28) that will receive/forward network traffic associated with the task from a source and to a destination. For example, application scheduler 32 can identify each switch involved in the network traffic flow from source to destination. In various embodiments, network traffic flow information associated with the network traffic flow can include source port, source IP address, destination port, destination IP address, and/or other network traffic flow information.

At block 116, distributed application 30 communicates the job information and its associated network traffic flow information to application network manager 50. For example, application network manager 50 receives a job ID associated with the job, a network traffic priority level of network traffic associated with the task, and corresponding network traffic flow information (e.g., source port, source IP address, destination port, destination IP address) from application scheduler 32. At block 118, application network manager 50 adds network traffic associated with the task to an access control list based on the network traffic priority and network traffic flow information. For example, application network manager 50 adds network traffic associated with the task to access control lists of any network elements (such as switches) that will be carrying the network traffic. In various embodiments, application network manager 50 identifies switches in network 14 from the network traffic flow information (e.g., source port, source IP address, destination port, destination IP address,), and application network manager 50 communicates with any the switches that will carry the network flow, such that each switch is configured to permit network traffic from the source node associated with the source IP address and to the destination node associated with the destination IP address with the network traffic priority as defined by respective ACLs 42. For example, based on network traffic priority level of network traffic associated with the task, application network manager 50 assigns network traffic associated with the task to an access control list associated with switches (such as one of ACLs 42) and updates the access control list to include an ACL entry that includes the source IP address and destination IP address for network traffic associated with the task. As noted above, ACLs 42 are matched with network traffic priority classes having defined QoS features. Accordingly, the ACL entry automatically adds network traffic associated with the task to QoS supervision for priority and bandwidth policing. The switches then know how to filter network traffic associated with the task. At block 120, once network traffic associated with the task ceases (for example, the task is completed or halted), distributed application 30 can notify application network manager 50, which can then remove the ACL entry from the ACL attached to the switches.

The foregoing discussion describes a distributed application framework for dynamically and adaptively prioritizing network traffic in network 12 using application level awareness at the network level, which is described herein in a context of Hadoop® like application frameworks. It is noted that the present disclosure is not limited to Hadoop® like application frameworks, and the dynamic and adaptive prioritization schemes described herein can be applied to any distributed application framework. Such configurations can improve network utilization, improve workload scheduling efficiency, and/or improve network traffic prioritization.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, application network manager 50. In some embodiments, one or more of these features may be implemented in hardware, provided external to these elements, or consolidated in any appropriate manner to achieve the intended functionality. The various network elements (e.g., application network manager 50) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, application network manager 50 and other components of communication system 10 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein. In one example, processors (e.g., processor 50) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 52) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method comprising:
   determining a network traffic priority for network traffic based on at least one of a user priority and a task priority, the network traffic associated with a task of a job that generates the network traffic;
   adding the network traffic to an access control list of a network classification model based on quality of service (QoS) features, the network classification model associated with a network element;
   marking the network traffic with the QoS features via the network classification model for directing the network traffic in a network; and
   removing the network traffic from the access control list when the task is completed or halted,
   wherein,
      the task priority is based on at least a type of data, and
      the type of data includes at least one of ingest data, intermediate data, replication of result data, replication of input data, replication of data due to node failure of currently used/accessed data, or replication of data due to node failure of unused data.

2. The method of claim 1, wherein the network classification model is associated with a network traffic priority class associated with the QoS features, such that the network traffic traverses the network according to the QoS features.

3. The method of claim 1, further including:
   receiving network traffic flow information for the network traffic; and
   identifying the network element based on the network traffic flow information.

4. The method of claim 3,
   wherein,
      the network element is at least one switch involved with directing the network traffic, and
      the access control list is attached to the at least one switch.

5. The method of claim 1,
   wherein,
      the network traffic priority is based on the task priority, and
      the task priority includes a priority level that varies based on underlying data of the network traffic and/or context that generated the underlying data of the network traffic.

6. The method of claim 1, further comprising:
   assigning the user priority to the job by a user or based on a default user priority associated with the user.

7. The method of claim 1,
   wherein,
      the network classification model is associated with a network traffic priority class associated with the QoS features, and
      the QoS features define a percentage of a bandwidth of a network link reserved for the network traffic priority class.

8. The method of claim 1, further comprising:
   defining a maximum output rate for a network traffic priority class for the network element, when the network is congested, based on the QoS features.

9. The method of claim 1,
   wherein,
      the network traffic priority is based on the user priority and the task priority, and
      the user priority is associated with a user that initiated the job.

10. The method of claim 9, further comprising:
    identifying the user that initiated the job.

11. The method of claim 10, further comprising:
    identifying the task of the job that generated the network traffic.

12. Logic encoded in non-transitory media with instructions that, when executed by a processor, cause the processor to perform operations comprising:
    determining a network traffic priority for network traffic based on at least one of a user priority and a task priority, the network traffic associated with a task of a job that generates the network traffic;
    adding the network traffic to an access control list of a network classification model based on quality of service (QoS) features, the network classification model associated with a network element;
    marking the network traffic priority with the QoS features via the network classification model for directing the network traffic in a network; and
    removing the network traffic from the access control list when the task is completed or halted,
    wherein,
       the task priority is based on at least a type of data, and
       the type of data includes at least one of ingest data, intermediate data, replication of result data, replication of input data, replication of data due to node failure of currently used/accessed data, or replication of data due to node failure of unused data.

13. The logic of claim 12, wherein the operations include:
    receiving network traffic flow information for the network traffic; and
    identifying the network element based on the network traffic flow information.

14. The logic of claim 13,
    wherein,
       the network element includes is at least one switch involved with directing the network traffic, and
       the access control list is attached to the at least one switch.

15. The logic of claim 13,
    wherein,
       the adding of the network traffic to the access control list includes updating the access control list with an access control list entry, and
       the access control list entry includes a source port, a source IP address, a destination port, and a destination IP address associated with the network traffic.

16. The logic of claim 12,
    wherein,
       the network traffic priority is based on the task priority, and
       the task priority includes a priority level that varies based on underlying data of the network traffic and/or context that generated the underlying data of the network traffic.

17. The logic of claim 12,
    wherein,
       the network classification model is associated with a network traffic priority class having the QoS features, and
       the QoS features define a percentage of a bandwidth of a network link reserved for the network traffic priority class.

18. An apparatus comprising:
    a memory element for storing data; and a processor operable to execute instructions associated with the data, the processor and the memory element cooperating such that the apparatus is configured for:

determining a network traffic priority for network traffic based on at least one of a user priority and a task priority, the network traffic associated with a task of a job that generates the network traffic;

adding the network traffic to an access control list of a network classification model based on quality of service (QoS) features, the network classification model associated with a network element;

marking the network traffic priority with the QoS features via the network classification model for directing the network traffic in a network; and removing the network traffic from the access control list when the task is completed or halted, wherein, the task priority is based on at least a type of data, and the type of data includes at least one of ingest data, intermediate data, replication of result data, replication of input data, replication of data due to node failure of currently used/accessed data, or replication of data due to node failure of unused data.

19. The apparatus of claim 18, wherein the apparatus is further configured for:

receiving network traffic flow information for the network traffic;

identifying the network element based on switch information; and removing an access control list entry when the task is completed or halted.

20. The apparatus of claim 18, wherein, the network classification model is associated with a network traffic priority class having the QoS features, and the QoS features define a percentage of a bandwidth of a network link reserved for the network traffic priority class and/or a maximum output rate for the network traffic priority class for the network element when the network is congested.

\* \* \* \* \*